April 16, 1963  F. FALLA  3,085,498
FRYING KITCHEN UTENSIL
Filed Jan. 18, 1962

INVENTOR.
FERNANDO FALLA
BY

3,085,498
FRYING KITCHEN UTENSIL
Fernando Falla, 59 Elm St., Millburn, N.J.
Filed Jan. 18, 1962, Ser. No. 168,022
2 Claims. (Cl. 99—347)

The invention refers to a fumeless frying kitchen utensil whereby all the frying of food can be done while preventing any fumes from scaping into the atmosphere as well as eliminating any spattering on the kitchen stove top.

While frying foods, oils, greases or fats are used, which frying media have boiling points of, plus or minus 500 degrees F. All foods begin to carbonize at about 400 degrees F., so that the frying action takes place at or above the boiling point temperature of the frying media. It follows that any frying action will release frying media vapors, that if released into the atmosphere, will condense in a form of a fog, composed of microscopical droplets which will eventually find their way into the clothes of the housewife and the kitchen walls.

It is the primary object of this invention to eliminate such hazards by providing means to condense all frying vapors inside the kitchen utensil.

Figure 1:
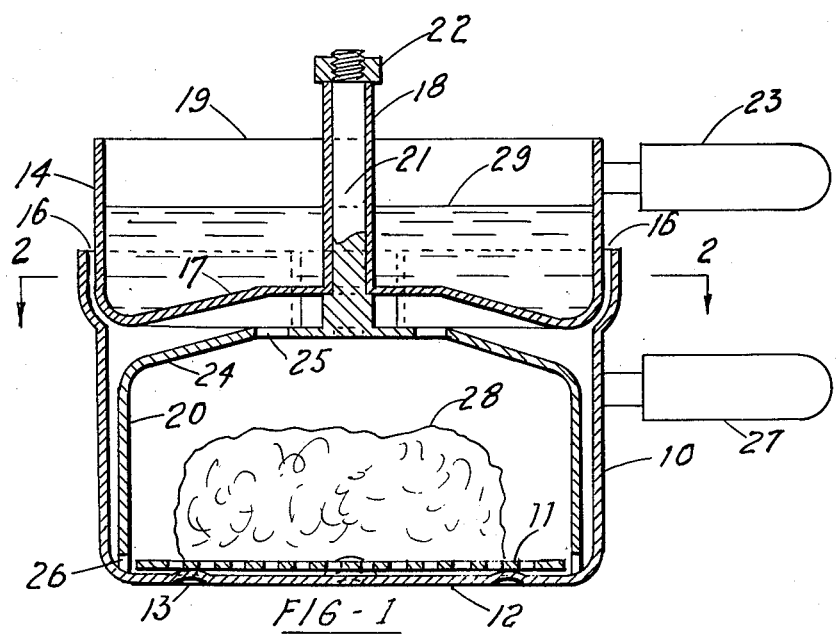
Figure 2:
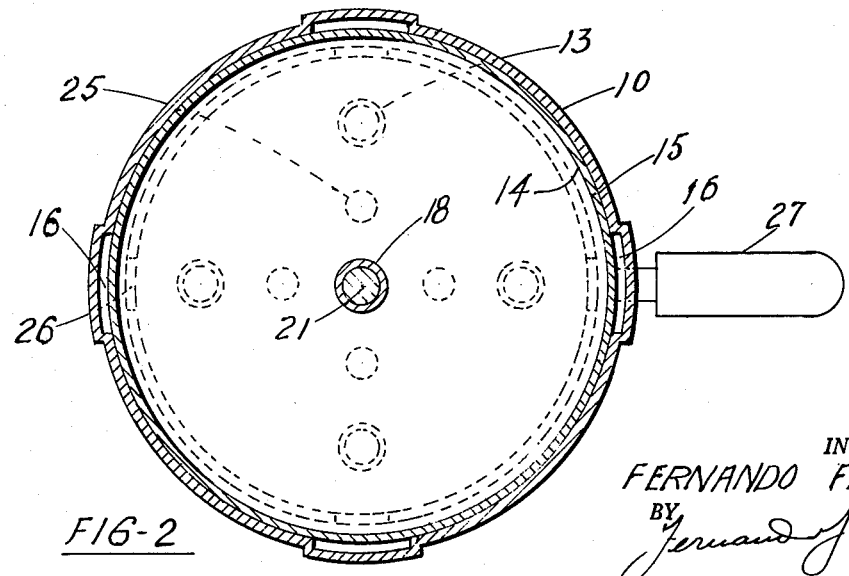

The invention will be best understood by reading the following specific description in connection with the accompanying drawings, in which FIGURE 1 is a vertical axial section view of the utensil; and FIGURE 2 is a horizontal cross-section taken on line 2—2 in FIGURE 1 looking in the direction of the arrows.

Referring to FIGURE 1, 10 is the frying container, 11 is a perforated plate that rests on the bottom 12 of the frying container and is slightly separated from it by means of bumps 13. The condensing cup 14 fits slidably on the upper part of the frying container 10, as indicated at 15 FIGURE 2. The upper part of the frying container 10 has an inside diameter the same as the outside diameter of cup 14 and the lower part of the frying container 10 has the same inside diameter as the inside diameter of the condensing cup 14. This will provide a rest for the condensing cup 14 on the frying container 10. Outlets 16 are formed by outwardly bumping portions of the upper end of frying container 10. The condensing cup 14 has an upwardly formed conical bottom 17 and a center tube 18 extending above upper edge 19 of condensing cup 14. A bell shaped food cover 20 has a stem 21 that slidably fits into tube 18 and protrudes above it terminating with nut 22 that fastens the bell food cover 20 to condensing cup 14 so that, when lifting condenser cup 14 by means of handle 23, both the condensing cup 14 and the bell food cover 20 will form one unit. The bell food cover 20 has a conical top 24 of the same angle as the conical portion 17 of the condensing cup 14. At the central top part of the bell food cover 20 there are vapor openings 25 circularly disposed and in close proximity to the stem 21. At the lower end of the bell food cover 20 there are disposed condensate ports 26 for the condensate return to the bottom 12 of the frying container 10. Handle 27, on the frying container 10, serves it and also handles the whole utensil when assembled.

The operation of the utensil begins by placing the selected food 28 on top of the perforated plate 11. Some foods contain plenty of fat while others contain lesser quantities to fry the food on its own fat, this as it is intended means that when frying foods short of fat, it is desirable to add enough fat with such foods. Next, water must be added to the frying container 10 (about 20% of the food weight). Now the bell food cover 20 and the condensing cup 14 assembly is to be lowered in position as shown on FIGURE 1. The last step before firing, is to add water to the condensing cup 14 as shown on level 29. Now the utensil is ready to be fired by placing it on top of a stove burner, not shown.

After a short time of firing, the water placed on the frying container 10 begins to boil. This will do two definite actions; first it will melt all the fat added as well as that in the food and second, as the boiling continues, it will cook the food but it will not fry it. During this boiling action all the water vapors will rise through the vapor openings 25 and heat the water 29 in condensing cup 14 by the condensation of the steam vapors. Such condensate will flow back to the bottom of the frying container 10 by virtue of conical portions 17 and 24 and will enter the bottom 12 of the frying container 10 through condensate return ports 26. This action will continue until the water 29 in the condensing cup reaches the boiling point temperature. When this happens, the steam vapors begin to come out through outlets 16. At this time, the water at the bottom 12 of the frying container 10 will gradually disappear and when practically all this water has been evaporated, the food will be thoroughly cooked but not fried. At this time the fats will rise in temperature and begin to boil; this will fry the food. Since the food is under the bell food cover 20, all the fat vapors will rise and come out by way of the vapor openings 25. After some of them have condensed on the food surface frying it and basting it they will return to bottom 12 through ports 26 for reevaporation. Since the conical bottom 17 is close to the conical top 24 and at the water boiling point of 212 degrees F., the fat vapors at 500 degrees will condense and will not come out of the utensil through the outlets 16. However, this will not prevent water vapor from escaping from the utensil. The water vapor passing through openings 16 will carry the smell that identifies the final cooking action. The perforated plate 11 keeps the food from direct contact with the bottom 12 of the utensil and allows a small film of liquid fat to be under it and to be evaporated. This prevents the food from carbonizing and sticking to the bottom 12.

One feature of my invention is that the bell food cover 20 provides an insulating chamber that will maintain a constant temperature inside of it. The top passage between the conical bottom 17 and the conical top 24, as well as the annular space between the cylindrical portion of the bell food cover 20 and the wall of the frying container 10, provide a vapor thermal insulating chamber that maintains, as constant as possible, the temperature inside of the bell food cover 20. This feature provides a condition, whereby, the food 28 can be boiled, steamed and ultimately browned, all over, without turning it over. It means that during the maximum activity of the frying or the roasting, there is no need of lifting the assembly of the condensing cup 14 and the bell food cover 20 for inspection of the food. When the frying is completed, and detected by the smell coming out of the outlets 16, the fire is shut off. A few seconds later the inside of the bell food cover 20 will have condensed all fumes. At this time, the assembly of the condensing cup 14 and the bell food cover 20, can be lifted with no danger. It is to be noted that, when the grease vapors, at 500 degrees F., come in contact with the atmosphere, at 70 degrees F., they will condense in the form of microscopical droplets that create a fog appearance, in the surrounding ambient. This will never happen to cause the condensing cup 14, with boiling water, will rapidly condense any grease fumes during the frying as well as immediately after the fire is off.

When the frying is completed and gravy is desired, the condensing cup 14 and the bell food cover 20 are removed, after shutting off the burner, and then, by means of nut 22 the bell food cover 20 is removed and the condensing cup is replaced without the bell food cover 20 after food 23 is removed. At this time water can be added through tube 18, now open, so that the first rapid water and fumes evaporation, due to the water added to the hot utensil, or quenching, will condense in the conical top 17, this action is momentary so that soon the condensing cup 14 can be removed and the gravy can be finished in the usual way.

For simple light ordinary frying, the bell food cover 20 can be dispensed with as well as the center tube 18. The bell food cover 20 is important when frying heavy pieces that require longer time and need a complete surrounding of hot vapors.

In practice the openings 16 are more numerous than shown and of very small area, this helps to completely condense all the fats inside of the utensil.

I claim:

1. A frying kitchen utensil comprised of a cylindrical open topped frying container with its cylindrical open end of larger diameter than its bottom; a condensing cup fitting slidably on top of the frying container so as to rest upon a ledge formed by the change in diameter of the frying container; a plurality of small outlets for the frying container formed in the upper edge of the open topped frying container; the condensing cup having an upwardly directed conical bottom centrally ending in a tubular vertical member in communication with the frying container, the end of the tubular member extending above the rim of the condensing cup; a bell food cover having cylindrical sides and an upwardly directed conical top fitted inside of the frying container so as to leave a gap between the condensing cup, the frying container and the bell food cover to allow condensate to return to the bottom of the frying container, a plurality of small openings in the lower end of the bell food cover to establish communication between the gap and the inside of the frying container; a central vertical stem on the top of the bell food cover slidably fitting into the tubular vertical member of the condensing cup and extending above it, means for fastening the bell food cover to the condensing cup; and a plurality of openings on top of the bell food cover circularly and centrally disposed about the central vertical stem to establish communication between the inner part of the bell food cover and the gap under the condensing cup.

2. A frying utensil according to claim 1, further including a flat, thin perforated plate resting on the bottom of the frying container and adapted to support food.

References Cited in the file of this patent

UNITED STATES PATENTS

| | | |
|---|---|---|
| 1,343,114 | Colson | June 8, 1920 |
| 1,393,762 | Demuth | Oct. 18, 1921 |
| 1,789,349 | Ballman | Jan. 29, 1931 |
| 2,081,751 | Lendrum et al. | May 25, 1937 |
| 2,527,395 | Burditt | Oct. 24, 1950 |
| 2,541,094 | Pesenti | Feb 13, 1951 |

FOREIGN PATENTS

| | | |
|---|---|---|
| 164,702 | Germany | Oct. 18, 1904 |